July 1, 1958     F. A. CAMPBELL     2,840,926
MEMORIZING AID
Filed Feb. 18, 1957     2 Sheets-Sheet 1
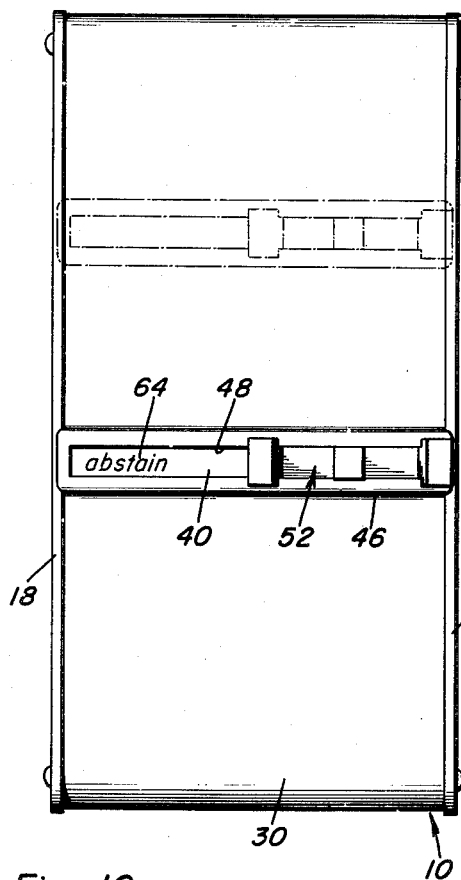
Fig. 1
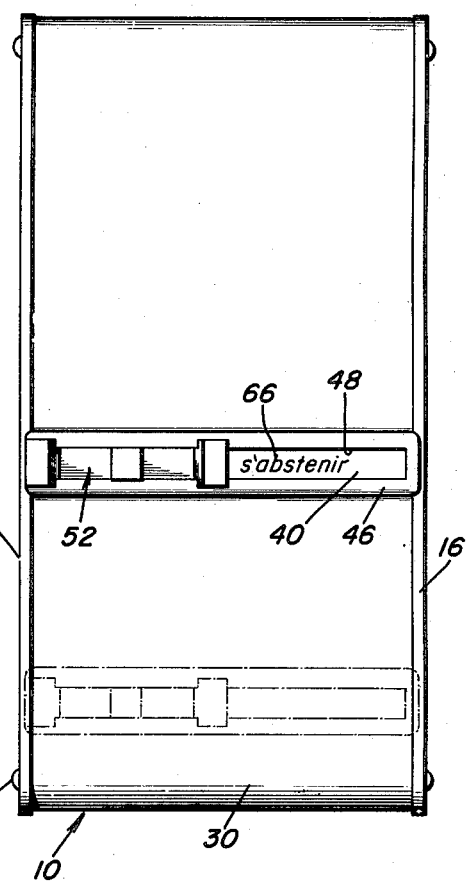
Fig. 2
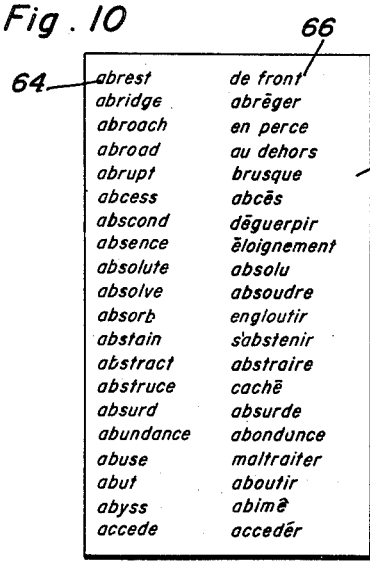
Fig. 10
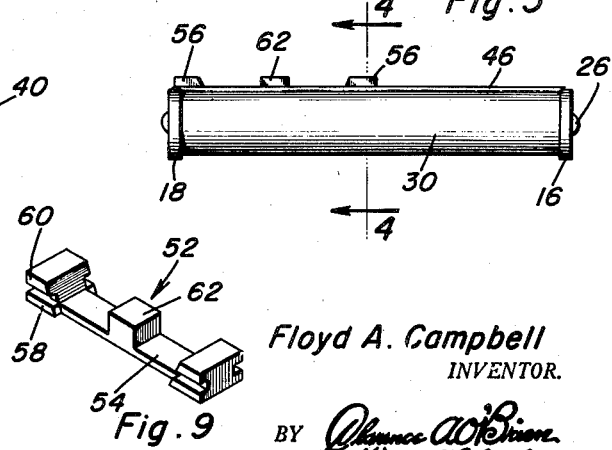
Fig. 3
Fig. 9
Floyd A. Campbell
INVENTOR.

July 1, 1958 F. A. CAMPBELL 2,840,926
MEMORIZING AID
Filed Feb. 18, 1957 2 Sheets-Sheet 2

Floyd A. Campbell
INVENTOR.

BY Clarence A. O'Brien
and Harvey B. Jacobson
Attorneys

United States Patent Office 2,840,926
Patented July 1, 1958

2,840,926

MEMORIZING AID

Floyd A. Campbell, Springfield, Ohio

Application February 18, 1957, Serial No. 640,704

5 Claims. (Cl. 35—35)

The present invention generally relates to a device for aiding in memorizing certain data and is especially adapted for use in memorizing words and phrases of a foreign language and other similar facts, tables and statistics.

An object of the present invention is to provide a mechanical device for facilitating memorizing of certain facts in that it renders it possible to rapidly scan numerous words and phrases and their unknown equivalent thereby facilitating their committal to memory by mental repetition.

Another object of the present invention is to provide a memorizing aid incorporating a device for holding a multiplicity of cards with each card containing two parallel columns of words or phrases with known words in one column and their unknown equivalents directly opposite in the other column and also to provide a means for rapid scanning of each word in the familiar column while mentally picturing its unknown equivalent and a means for a quick glance at the unknown equivalent in the other column when it cannot be called to memory.

Another important object of the present invention is to provide a memorizing aid in accordance with the preceding objects in which the means for permitting a glance at the unknown words and the means for reviewing the known words also incorporates features which permits the ejection of one card at the top of a stack of cards thus revealing a second card for a repetition of the process.

Other important features of the present invention reside in its simplicity of construction, ease of use, adaptation for teaching various facts and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the present invention showing the movable shuttle in position concealing the unknown word and reviewing the known word;

Figure 2 is a plan view of the present invention illustrating the shuttle in position for revealing the unknown word;

Figure 3 is an end elevational view of the device of the present invention;

Figure 4:
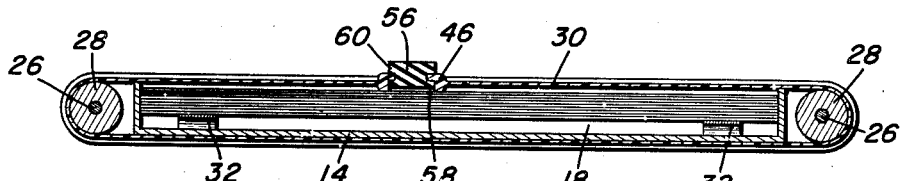
Figure 4 is a longitudinal, vertical sectional view taken substantially upon a plane passing along section line 4—4 of Figure 3 illustrating the structural details of the device.
Figure 5:
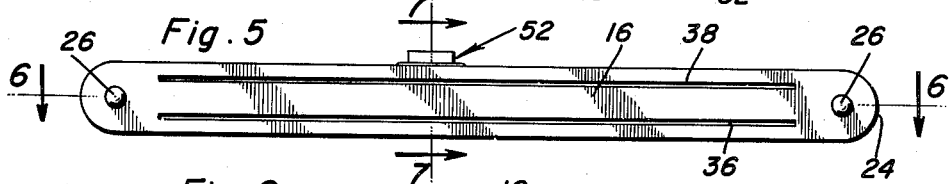
Figure 5 is a side elevational view of the present invention illustrating the slots for ejecting and receiving the cards having the columns of words thereon.
Figure 6:
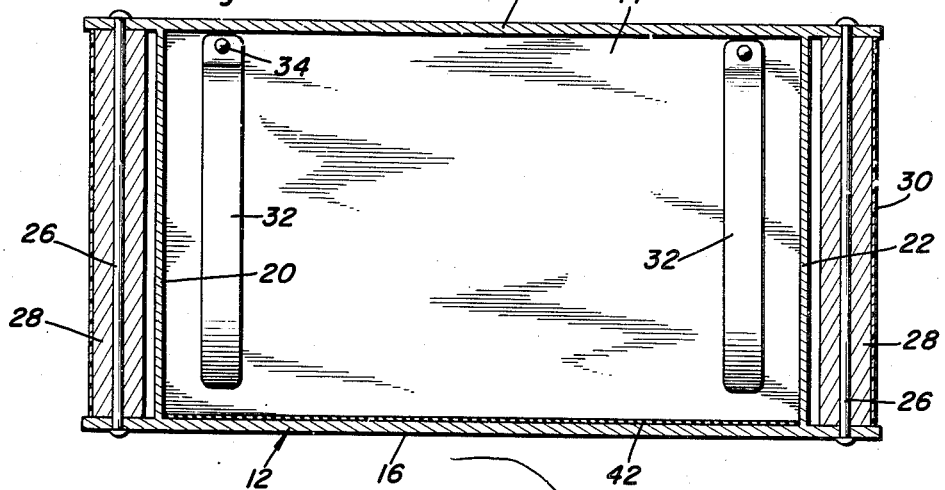
Figure 8:
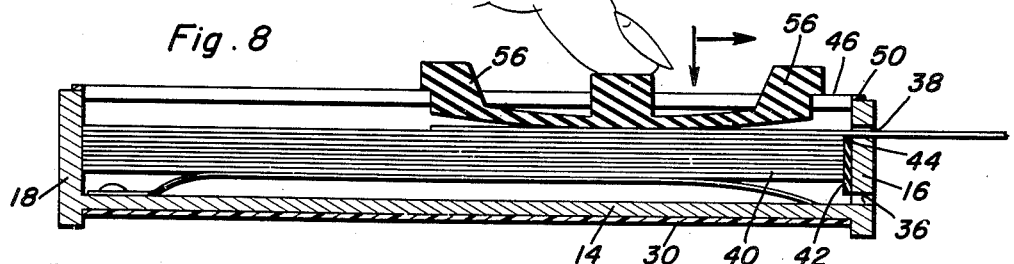
Figure 7:
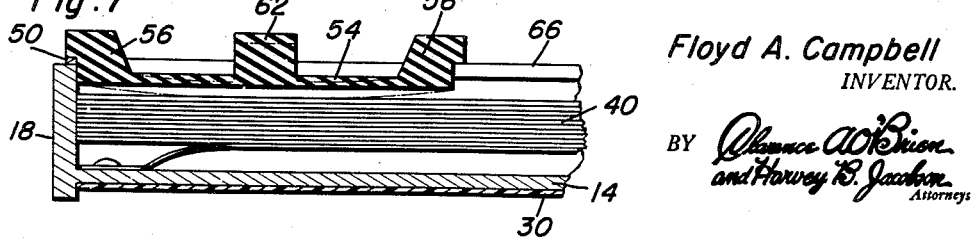

Figure 6 is a longitudinal, plan sectional view taken substantially upon a plane passing along section line 6—6 of Figure 5 illustrating further structural details of the present invention; and Figure 7 is a partial transverse sectional view on an enlarged scale taken substantially upon a plane passing along section line 7—7 of Figure 5 illustrating the relationship of the stack of cards and the transversely movable shuttle;

Figure 8 is a transverse sectional view similar to Figure 7 illustrating the movement of the shuttle for ejecting the uppermost card;

Figure 9 is a perspective view of the movable shuttle; and

Figure 10 is a plan view of one of the cards having two columns of words thereon.

Referring now specifically to the drawings, the numeral 10 generally designates the memorizing aid of the present invention which includes a casing or housing generally designated by numeral 12 which includes a bottom wall 14 and a pair of side walls 16 and 18. A pair of transverse end walls 20 and 22 extend between the side walls 16 and 18 inwardly of the ends thereof with the end walls 20 and 22 being connected with the bottom wall 14 and side walls 16 and 18. It is noted that the bottom wall 14 is spaced inwardly from the bottom edges of the side walls 16 and 18 and the ends of the side walls 16 and 18 are rounded as designated by numeral 24.

Extending between the aligned rounded ends of the side walls 16 and 18 exteriorly of the end walls 20 and 22 is a transverse pin 26 having a roller 28 journaled thereon. The roller 28 has its periphery spaced slightly inwardly of the rounded end edges 24 of the side walls 16 and 18 wherein an endless flexible belt 30 is disposed completely around the casing 12 with the belt 30 being supported on the rollers 28 for longitudinal movement with the belt 30 being disposed in between the side walls 18 throughout its entirety inasmuch as the side walls 16 and 18 project below the bottom wall 14 and above the top edge of the end walls 20 and 22.

The inner surface of the bottom wall 14 is provided with a pair of arcuately bowed springs 32 having one end secured to the bottom 14 as by fastening means 34 and having the free end bowed downwardly into engagement with the inner surface of the bottom 14. The side wall 16 is provided with a pair of elongated longitudinal slots 36 and 38 with the slot 36 being disposed immediately adjacent the upper surface of the bottom 14 and the upper slot 38 being disposed adjacent the top of the side wall 16. The slot 36 is for receiving a plurality of cards 40 with the cards 40 being inserted one at a time through the slot 36 thereby providing a stack of cards 40 within the housing 12 with one card being disposed above the other. The slot 38 is for permitting the ejection of the cards 40 as illustrated in Figure 8. Along the inner surface of the wall 16 between the slots 36 and 38 is a rubber member 42 having a thin upper edge 44 projecting slightly above the bottom of the slot 38 thereby assuring ejection of a single card 40 and preventing multiple ejection thereof.

The elongated flexible belt 30 is provided with a transversely extending window adapter 46 having a transversely extending opening 48 therein forming a window for revealing the upper surface of the cards 40 therethrough. The ends of the window adapter 46 are provided with outwardly extending flanges 50 slidably engaging the upper surface of the side walls 16 and 18. Transversely slidable in the opening 48 is a shuttle generally designated by numeral 52 which is constructed of rubber and is of a length substantially one-half of the length of the window opening 48 for concealing substantially one-half of a card underlying the window 48. The shuttle 52 is preferably constructed of molded rubber or similar flexible material and includes an elongated flexible bottom portion 54 substantially equal in width to the window opening 48 with each end of the elongated portion 54 being provided with an enlargement 56 having laterally projectng lower flanges 58 and laterally projecting upper flanges 60 for slidably receiving the side edges of the window opening 48 thereby slidably mounting the shuttle 52 in the window opening 48. The central portion of the elongated flexible member 54 is provided with an enlarged upwardly extending portion 62 forming a handle for depression of and transverse movement of the shuttle 52 in the window opening 48 for ejecting one of the cards 40 as illustrated in Figure 8.

Figure 10 illustrates the construction of the card 40 including a column of known words 64 and a column of unknown words 66 which are illustrated as being English words and corresponding French words although it is pointed out that any language could be used or other facts, tables or statistics. By moving the shuttle to the right extremity of the window opening 48 as shown in Figure 1 and by longitudinal movement of the flexible belt 30, the various words in the column 64 may be reviewed. Then by sliding the shuttle 52 laterally as illustrated in Figure 2, the corresponding unknown word in the column 66 may be reviewed or merely glanced at depending upon movement of the shuttle 52 by the person employing the device. When all of the information on the uppermost card 40 is learned, the central member 62 may be depressed and moved transversely for moving the first or uppermost card 40 outwardly of the groove 38 inasmuch as the rubber edge 44 will prevent multiple ejection. This card may be replaced in the bottom slot 36 for subsequent use or may be completely discarded depending upon the desires of the particular user.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A memorizing aid comprising a housing having a bottom wall, upstanding side walls and upstanding end walls, said side walls projecting beyond the bottom and end walls, rollers journaled between the ends of the side walls exteriorly of the end walls, a flexible belt encircling the housing and movable on the rollers, a card having longitudinal rows of indicia disposed on the upper surface of said bottom wall and underlying the upper run of the endless flexible belt, said belt having a transverse window selectively revealing transversely aligned indicia in each row of indicia on the card, and a transversely movable shuttle in said window for selectively revealing and concealing the card indicia in one row or the other revealed through said window.

2. The combination of claim 1 wherein one of said side walls is provided with a pair of vertically spaced longitudinal slots with the uppermost slot being disposed immediately under the upper run of the flexible belt, and means on said shuttle for ejecting the uppermost card from the uppermost slot.

3. The combination of claim 2 wherein a pair of bowed springs are mounted on the upper surface of the bottom for resiliently urging a plurality of cards towards the inner surface of said belt.

4. The combination of claim 3 wherein the side wall having the slots therein is provided with a rubber strip on the inner surface, said strip terminating in a feather upper edge extending slightly beyond the lower edge of the upper slot thereby preventing ejection of a plurality of cards.

5. The combination of claim 4 wherein said means on the shuttle for ejecting the uppermost card includes a depressible central portion having an upwardly projecting finger receiving abutment whereby the central portion of the shuttle may be depressed into engagement with the uppermost card and moved transversely for ejecting the card.

References Cited in the file of this patent

UNITED STATES PATENTS

| | | |
|---|---|---|
| 1,609,959 | Prescott | Dec. 7, 1926 |
| 1,864,022 | Jewell | June 21, 1932 |
| 1,879,501 | Rigler | Sept. 27, 1932 |
| 2,270,137 | O'Brien | Jan. 13, 1942 |
| 2,493,668 | Gonzalez | Jan. 3, 1950 |
| 2,628,435 | Minninger | Feb. 17, 1953 |
| 2,715,784 | Genest | Aug. 23, 1955 |

FOREIGN PATENTS

| | | |
|---|---|---|
| 601,043 | France | Nov. 23, 1925 |
| 508,570 | Great Britain | Sept. 28, 1937 |
| 524,295 | Great Britain | Aug. 2, 1940 |